United States Patent [19]

Reaume

[11] 4,133,390
[45] Jan. 9, 1979

[54] TINE ARRANGEMENTS FOR GARDEN TILLERS

[75] Inventor: Leonard V. Reaume, Jackson, Miss.

[73] Assignee: Magna American Corporation, Raymond, Miss.

[21] Appl. No.: 665,890

[22] Filed: Mar. 11, 1976

[51] Int. Cl.² .................................................. A01B 33/02
[52] U.S. Cl. ....................................... 172/43; 172/548
[58] Field of Search .................. 172/42, 43, 177, 548, 172/549, 123, 185, 187, 555

[56] References Cited

U.S. PATENT DOCUMENTS

| 3,123,149 | 3/1964 | White | 172/42 |
|---|---|---|---|
| 3,180,428 | 4/1965 | Price | 172/42 |
| 3,442,335 | 5/1969 | Silbereis et al. | 172/43 |
| 3,935,906 | 2/1976 | Neal et al. | 172/177 |

FOREIGN PATENT DOCUMENTS 1320331  6/1973  United Kingdom .................... 172/548

Primary Examiner—Richard T. Stouffer
Attorney, Agent, or Firm—Melville, Strasser, Foster & Hoffman

[57] ABSTRACT

Improved tine arrangements for garden tillers including a basic tine assembly comprised of a plurality of relatively long tines configured to break a clod loose and a plurality of shorter tines configured to strike such clod and break it up. A typical garden tiller will include a frame mounting an engine, either vertical or horizontal, having handles by which the operator will guide the tiller and appropriate drive structure to rotate the tine shaft mechanism carrying the basic tine assemblies. Such a tiller may also include an adjustable wheel transport system and a fold-up adjustable stake with a swinging stabilizer which may be locked in fixed position for normal tilling or swinging for easy turn around at the end of a garden row. The engine may provide one or more forward speeds and a reverse if desired. The basic tines may provide a slicing or pick action. Whatever the nature of an individual basic tine assembly, it will include the relatively long and short tines earlier mentioned and generally there will be a pair of right hand basic tine assemblies and a pair of left hand basic tine assemblies.

8 Claims, 7 Drawing Figures

TINE ARRANGEMENTS FOR GARDEN TILLERS

BACKGROUND OF THE INVENTION

1. Field of the Invention

This invention is particularly suited for application to tillers used by the home gardener to cultivate his garden. These home garden tillers have become very popular and various models employing different types of engines and drives, as well as different tine arrangements, are available in the market place. Typical tiller and tine combinations and arrangements are shown in U.S. Pat. Nos. 2,864,293 — Edrich, et al, 3,074,491 — Field, 3,151,685 — Field and 3,202,004 — Field. Some tines may be arranged to provide what is known in the trade as a pick action, an action which is aggressive and which results in relatively deep and fast tilling. Other tines may be arranged to provide a slicing action, an action which is not so aggressive as the pick action, but an action which is less apt to get hung up in ground cover. And, as shown in U.S. Pat. No. 3,151,685, some tines may be arranged to produce either a pick action or a slicing action as desired.

The present invention may be applied to any basic tine assembly regardless of whether the tines are pick tines or slicer tines. Relatively short tines are inter spaced among relatively long tines in such manner that the short tines will break up the clods initially cut from the earth by the relatively long tines.

2. Description of the Prior Art

Although a search of the prior United States Patent Art was made in an effort to locate tines and tine arrangements of the type disclosed herein, no assertion is made that the best of such art was located, although that indeed was the purpose of the search. Such search developed the following U.S. Pat. Nos.: 1,754,311 — Foot, 2,755,718 — Arndt, 3,452,823 — Shapland, and 3,503,276 — Vigot.

Foot U.S. Pat No. 1,754,311 illustrates three digging tines a and three cutting blades b employed in each group, a tine being interposed between two cutter blades. By this arrangement the ground is first sliced whereafter a clod is pulled out. There are no tines or blades to effect further break-up of such clod. As noted in the Foot patent, a cutter b enters the soil in advance of, but to a less depth than, its tine a and, in order to enable a clod of earth to be torn laterally from the ground after being cut, a web or shoulder g is formed on each tine. Such a clod, therefore, would not be in position to be further broken up by any of the tines or blades.

Arndt U.S. Pat. No. 2,755,718 discloses a rotary tiller having multiple tines or blades, some of the blades functioning primarily to distrub the soil while others of the blades function primarily to advance the tiller.

Shapland U.S. Pat. No. 3,452,823 discloses lawn care apparatus having three types of blades, one to slice into the soil, one to remove the thatch immediately above the ground, and one to mow the grass.

Vigot U.S. Pat. No. 3,503,276 discloses a cultivator having tines generally similar in configuration to certain of those disclosed herein. This patent, however, does not disclose tines of different lengths for different purposes.

SUMMARY OF THE INVENTION

In known garden tiller tine arrangements a basic tine assembly may be comprised of four tines of a given length fixed on a plate which is attached to a driven shaft. It is also known to provide a basic tine assembly employing but three tines. In the arrangement of this invention, whether it be considered as applied to a four tine basic assembly or to a three tine basic assembly, additional tines are interposed between those comprising the basic tine assembly. The additional tines are shorter than those normally provided. The longer tines serve to break a clod loose from the soil in the usual manner whereafter the added shorter tines will strike that clod and break it up. This pulverizes the soil and provides a much improved tilling action. Such action derives not from the fact that more tines are employed, but rather it derives from the positioning of the shorter tines among the longer ones. If all of the tines were of the same length, one would follow another in substantially the same path and the additional breaking up of the loosened clods would not be realized.

DESCRIPTION OF THE PREFERRED EMBODIMENTS

Figure 1:
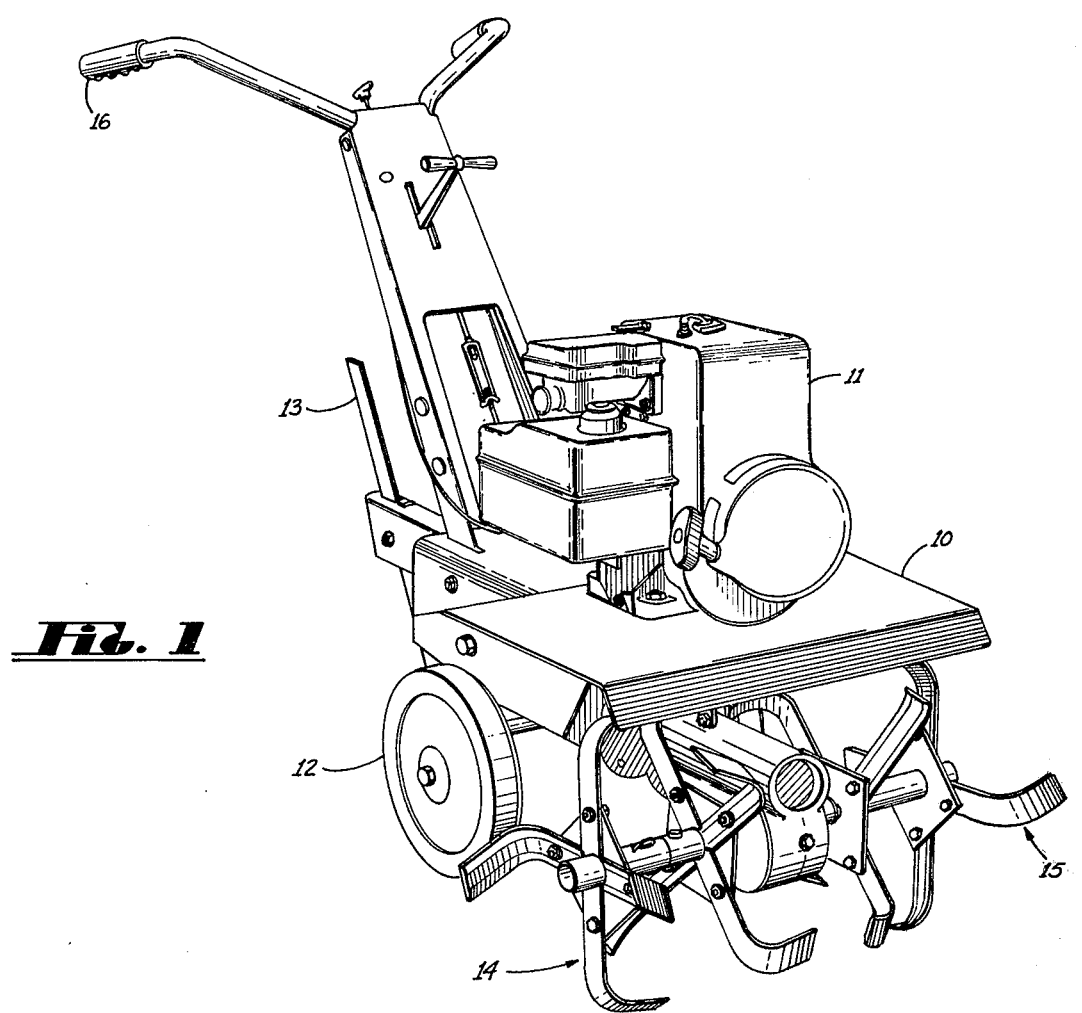
FIG. 1 is a perspective view of a typical prior art garden tiller to which this invention may be applied.

A typical prior art garden tiller is depicted in FIG. 1 and is comprised of frame structure 10 mounting an engine 11 and having an adjustable transport system including the wheels 12. An adjustable stake 13 which may be locked in fixed position for normal tilling or swinging for easy turn around at the end of a row, is also provided. Two sets of conventional right hand basic tine assemblies 14, and two sets of conventional left hand basic tine assemblies 15, are driven through a suitable drive from the engine 11. An operator guides the tiller by means of the handles 16.

Figures 2, 3:
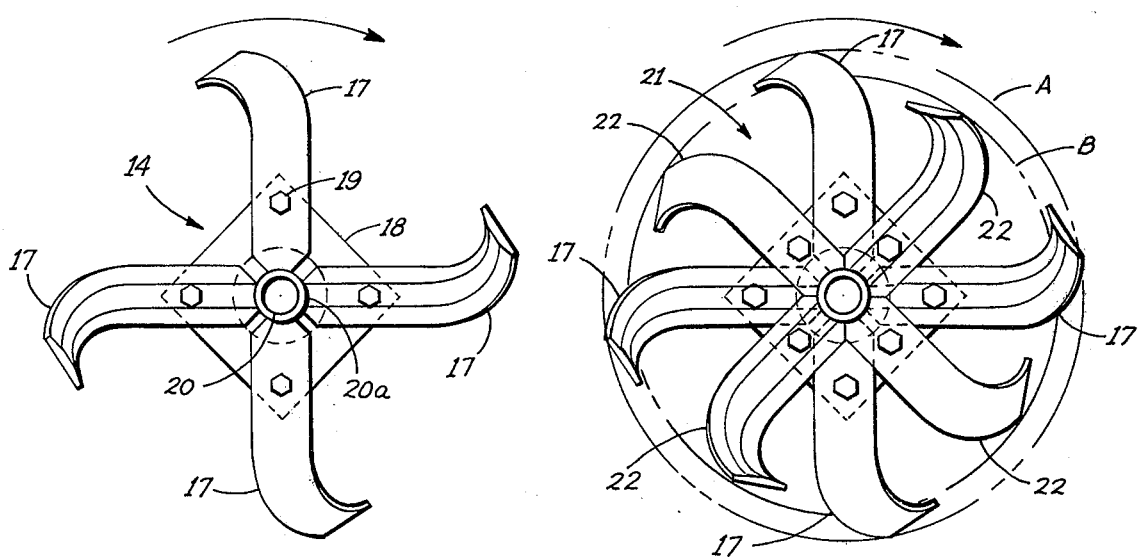
FIG. 2 is a side elevation of a typical, four tine basic prior art tine assembly.
FIG. 3 is a side elevation of one form of the improved basic tine assembly of this invention.

Referring now to FIG. 2, a conventional right hand basic tine assembly 14 is illustrated as comprised of four slicer tines 17 bolted or otherwise affixed to a plate 18 as indicated at 19, and which plate is secured to a shaft 20 driven by the engine 11. The inner ends of the tines 17 are configured to abut the hub 20a and, therefore, only one fastening means 19 is required for each such tine 17.

FIG. 3 depicts the manner in which the conventional right hand basic tine assembly 14 of FIG. 2 has been converted to the improved tine arrangement 21 of the instant invention. The improved tine arrangement, in addition to the tines 17 and plate 18 of the conventional assembly 14, includes four tines 22 which are relatively shorter than the tines 17. These shorter slicer tines 22 are affixed to the plate 18 in the same manner as are the tines 17. Each of the shorter tines 22 is interposed between a pair of the longer tines 17. The broken line A illustrates the path and extent of the longer tines 17 while the broken line B illustrates the path and extent of the shorter tines 22.

Figure 4:
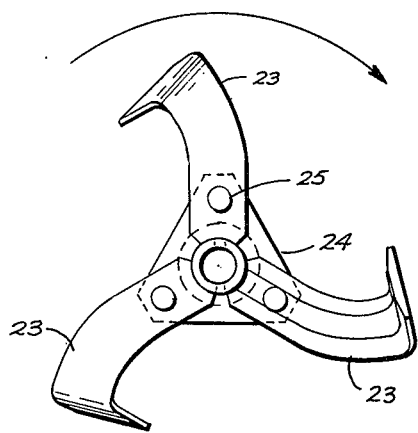
FIG. 4 is a side elevation of a typical, three tine basic prior art tine assembly.

FIG. 4 depicts a conventional, right hand basic tine assembly comprised of three tines 23 fixed to a plate 24 as indicated at 25.

Figure 5:
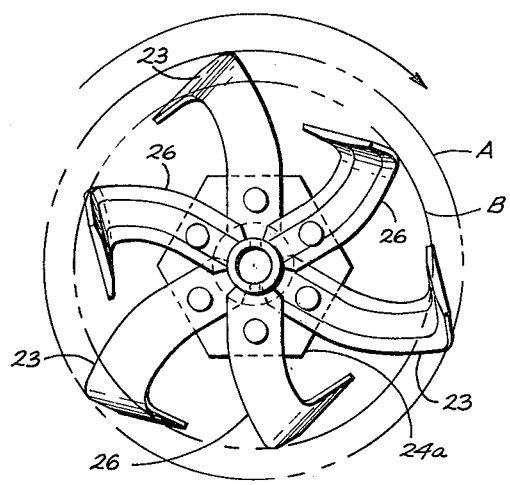
FIG. 5 is a side elevation of another form of the improved basic tine assembly of this invention.

FIG. 5 depicts how the conventional three tine arrangement of FIG. 4 may be converted to the improved tine arrangement of the instant invention. In order to effect this improvement three additional tines 26 are provided, each tine 26 being shorter than a tine 23 and being interposed between a pair of such tines 23. Again, the broken line A describes the path and extent of the relatively long tines 23 while the broken line B describes the path and extent of the relatively short tines 26. The shape of the plate 24 of FIG. 4 has been modified as indicated at 24a in FIG. 5 in order to accommodate all six of the slicer tines 23 and 26. In all of these FIGS. 2 through 5 the basic tine assemblies are considered as right handed and as moving in the direction (clock wise) indicated by the arrows in those FIGURES.

Figure 6:
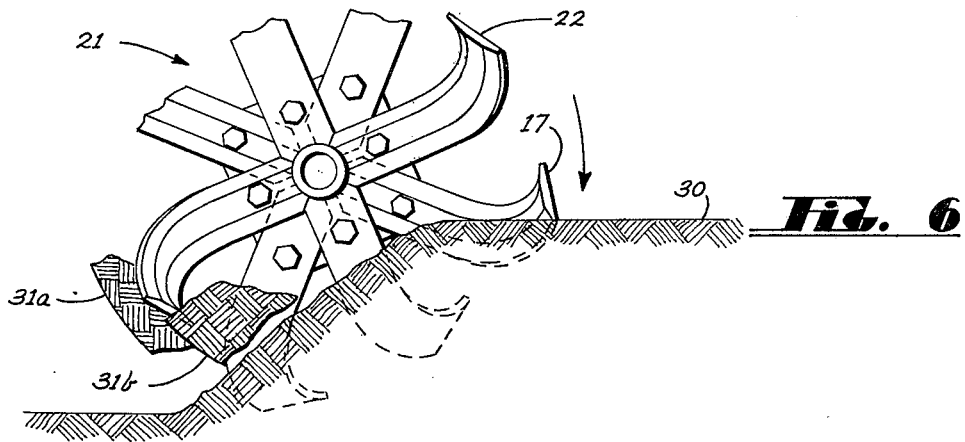
FIG. 6 is a fragmentary side elevation, partly perspective, illustrating the operation of the improved tine arrangement of this invention.
Figure 7:
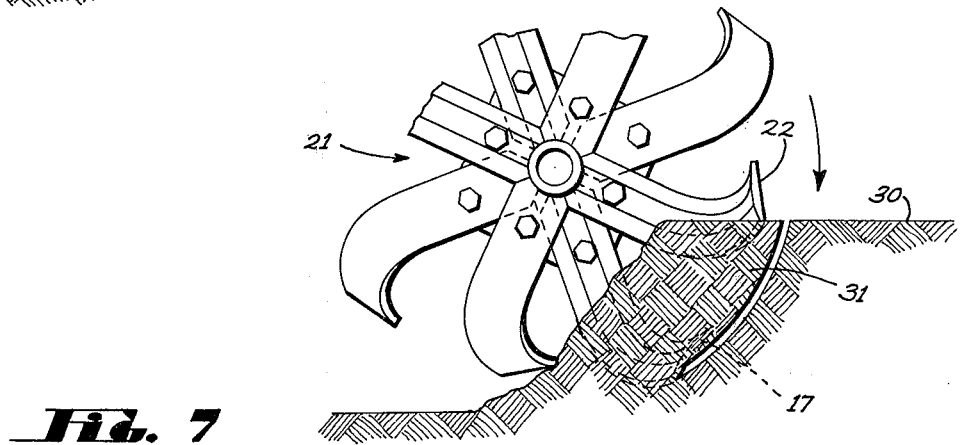
FIG. 7 is a view similar to that of FIG. 6 showing the relative positions of the long and short tines as tilling proceeds.

In operation the improved tine arrangement for a garden tiller, whether it be right handed or left handed, and whether it be an eight tine assembly or a six tine assembly, is depicted in FIGS. 6 and 7; in these figures the improved assembly 21 is that illustrated. It will be understood by those skilled in the art, however, that the operation of the improved arrangement shown in FIG. 5 will be similar.

In FIG. 6 the long tine 17 is shown as begining its cut into the soil 30 while the following short tine 22 has not yet reached the soil.

Considering these same two tines 17 and 22 of the improved basic tine assembly 21, it will be observed that in FIG. 7 the same long tine 17 has just about completed slicing a clod 31 from the soil 30 while the short tine 22 immediately following has initiated its break-up of such clod. It will be understood that the action of the six tine arrangement is like this as well.

As the improved basic tine assembly 21 continues its tilling function from the position of FIG. 7, the clod 31 will be broken into the segments 31a and 31b illustrated in FIG. 6. In this connection it will be undertsood by those skilled in the art that the tine assembly 21 is rotating in the direction indicated by the arrow in those figures and the tiller is considered as moving from left to right as viewed in these figures.

It will be apparent to those skilled in the art that modifications may be made in this invention without departing from the scope and spirit thereof. Two embodiments have been illustrated in FIGS. 3 and 5. Others are possible. It should be further understood that while the invention has been illustrated in terms of particular structures and arrangements, the invention is not to be limited to these particular structures and arrangements except insofar as they are specifically set forth in the subjoined claims.

The embodiments of the invention in which an exclusive property or privilege is claimed are defined as follows:

1. A tine assembly for garden tillers comprising a plate, a plurality of tines of a given length fixed to said plate, and a plurlaity of tines of a length shorter than said given length also fixed to said plate, a said tine of shorter length being interposed between a pair of said tines of given length, whereby a clod loosened in soil entered by a said tine of given length will be broken by a said tine of shorter length.

2. The tine assembly of claim 1 in which there are four of said tines of given length and four of said tines of shorter length, each said tine of shorter length being interposed between a pair of said tines of given length.

3. The tine assembly of claim 1 in which there are three of said tines of given length and three of said tines of shorter length, each said tine of shorter length being interposed between a pair of said tines of given length.

4. The tine assembly of claim 1 in which said plate includes an abutment, a said tine having an inner end engaging said abutment and an outer end to penetrate soil, and holding means between said inner end and said outer end fixing said tine to said plate against said abutment.

5. In a garden tiller comprised of a frame, an engine, a tine shaft, a drive from said engine to said shaft, handle means by which an operator may guide the tiller, control means for said engine and said tine shaft, a right hand tine assembly on said shaft, and a left hand tine assembly on said shaft, the improvement which comprises: a said tine assembly comprised of a plate, a plurality of tines of a given length fixed to said plate, a plurality of tines of a length shorter than said given length also fixed to said plate, a said tine of shorter length being interposed between a pair of said tines of given length, whereby a clod loosened in soil entered by a said tine of given length will be broken by a said tine of shorter length.

6. The garden tiller of claim 5 in which there are four of said tines of given length and four of said tines of shorter length, each said tine of shorter length being interposed between a pair of said tines of given length.

7. The garden tiller of claim 5 in which there are three of said tines of given length and three of said tines of shorter length, each said tine of shorter length being interposed between a pair of said tines of given length.

8. The garden tiller of claim 5 in which said plate includes an abutment, a said tine having an inner end engaging said abutment and an outer end to penetrate soil, and holding means between said inner end and said outer end fixing said tine to said plate against said abutment.

* * * * *